April 14, 1970  H. W. PARKER  3,506,644
MODIFIED CARBOXYALKYLCELLULOSE ETHERS
Filed Jan. 25, 1965
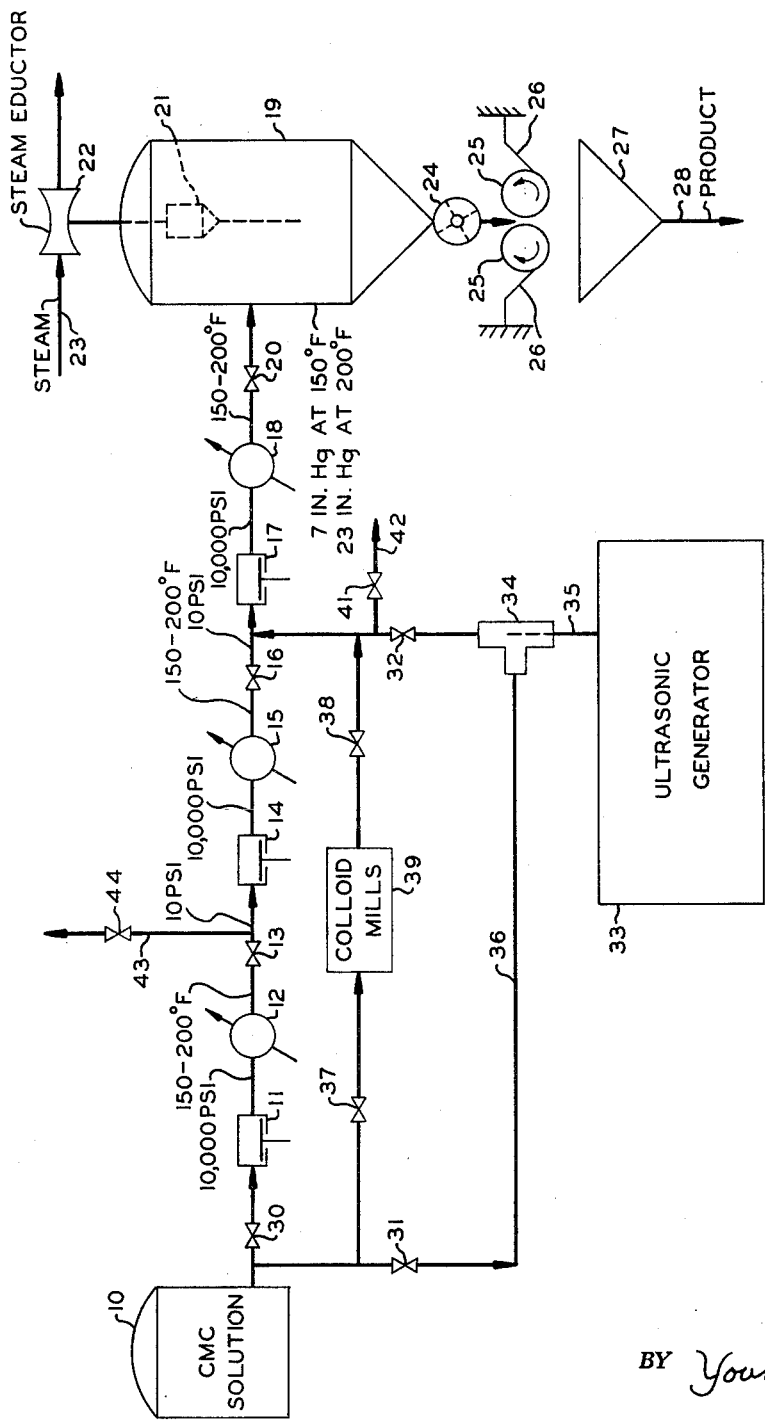
INVENTOR
H. W. PARKER
BY Young & Quigg
ATTORNEYS United States Patent Office 3,506,644
Patented Apr. 14, 1970

3,506,644
MODIFIED CARBOXYALKYLCELLULOSE ETHERS
Harry W. Parker, Bartlesville, Okla., assignor to Phillips Petroleum Company, a corporation of Delaware
Filed Jan. 25, 1965, Ser. No. 427,691
Int. Cl. C08b 11/20
U.S. Cl. 260—232
7 Claims

ABSTRACT OF THE DISCLOSURE

The water viscosifying property of carboxymethylcellulose is reduced without a corresponding decrease in fluid loss property by subjecting an aqueous dispersion of the CMC to a shearing stress.

---

This invention relates to carboxyalkylcellulose ethers modified so that the viscosity of aqueous dispersions of the ethers is reduced while the water loss properties of the dispersion are substantially unaffected. In one aspect this invention relates to a modified carboxymethylcellulose having enhanced properties for use as a drilling mud additive. In another aspect this invention relates to a method for modifying carboxymethylcellulose so as to reduce the viscosity of drilling fluids containing same without correspondingly increasing the fluid loss of the drilling fluid.

Carboxymethylcellulose, more precisely sodium carboxymethylcellulose, has been used by the drilling industry for many years as an additive to control flow properties and filtration rates of drilling fluids, principally water base drilling fluids, but has also been used in certain instances in oil and water emulsion drilling fluids and in oil base drilling fluids. Carboxymethylcellulose increases the viscosity of aqueous systems and at the same time reduces the filtration rate of such systems. In some systems, particularly high solids drilling fluids, i.e., those containing from 7 to 14 volume percent solids, it is extremely difficult to control the filtration rate of the drilling fluid within a desired range without increasing the viscosity of the drilling fluid more than is desired or can be tolerated. Carboxylmethylcellulose becomes degraded with use so that its ability to increase viscosity and decrease water loss is reduced with continued use in the drilling operation. Attempts have been made to degrade carboxymethylcellulose prior to its use as a drilling fluid additive by chemical and thermal treatment but the invariable result has been that the reduction in viscosifying effect of the carboxymethylcellulose has been accompanied by a corresponding decrease in fluid loss control properties and therefore the search for a material to control the fluid loss of high solids drilling fluids without increasing the viscosity has, until now, been unsuccessful.

Carboxymethylcellulose is available in high viscosity grade, medium viscosity grade and low viscosity grade. Water loss control property of the carboxymethylcellulose decreases as the viscosity grade decreases.

I have now discovered that carboxymethylcellulose can be modified by subjecting an aqueous dispersion to high shearing stress so that the apparent viscosity of drilling fluids containing the modified carboxymethylcellulose is reduced without a corresponding increase in fluid loss properties. The mechanical shearing can be accomplished by forcing a dispersion of the carboxymethylcellulose through an orifice under high pressure or by repeated passage through a colloid mill under an inert atmosphere or by subjecting the dispersion to ultrasonic wave treatment. The temperature of the dispersion should not be allowed to rise above about 200° F. during the mechanical degradation treatment so as to avoid appreciable thermal degradation.

I have found that carboxymethylcellulose can be modified to produce carboxymethylcellulose having viscosifying properties of low viscosity grade carboxymethylcellulose and water loss control properties of medium grade carboxymethylcellulose.

It is a principal object of this invention to modify carboxymethylcellulose so that its viscosifying effect in aqueous systems is reduced without a substantial change in its filtration rate control properties. It is also an object of this invention to provide a method for mechanical degradation of carboxymethylcellulose so as to improve its properties as a drilling fluid additive. A further object of this invention is to provide carboxymethylcellulose having enhanced properties as a drilling fluid additive. Still another object of the invention is to provide carboxymethylcellulose having viscosity properties of low viscosity grade carboxymethylcellulose and water loss properties of medium viscosity grade carboxymethylcellulose. Other objects and advantages will be apparent to one skilled in the art upon studying this disclosure including the detailed description of the invention and the appended drawing wherein:

The sole figure represents a schematic flow sheet of one embodiment of the invention for modifying the properties of carboxymethylcellulose.

In the drawing an aqueous dispersion of carboxymethylcellulose is passed from storage tank 10 to compressor 11 from whence it is passed through heat exchanger 12 at about 10,000 p.s.i., with the temperature being adjusted to about 150 to 200° F. The pressure is reduced in valve 13 to about 10 p.s.i. The pressure is again boosted to about 10,000 p.s.i. in compressor 14. The temperature is again adjusted to from about 150 to 200° F. in heat exchanger 15 and the pressure is again reduced to about 10 p.s.i. in valve 16. The pressure is again increased to about 10,000 p.s.i. in compressor 17. The temperature is adjusted to about 150 to 200° F. in heat exchanger 18 and the dispersion is then flashed into flash tank 19 through valve 20. Water vapor is removed from flash tank 19 via cyclone separator 21 and steam eductor 22 which is supplied by steam via conduit 23. The pressure in flash tank 19 is reduced by steam eductor 22 to a value sufficient to remove most of the water from the dispersion. For example, at a temperature of about 200° F., the pressure is reduced to 23 inches of mercury and at a temperature of 150° F. the pressure is reduced to about 7 inches of mercury. Other means for evacuating flash tank 19 can be employed; however, a steam eductor will be suitable in most instances.

The partly dehydrated carboxymethylcellulose is removed from the flash tank 19 via star valve 24 and is passed over heated rollers 25 with the dried carboxymethylcellulose being removed by knives 26. The dried product is collected in hopper 27 and removed via conduit 28.

Alternatively valves 30 and 16 can be closed, valves 31 and 32 opened and ultrasonic waves generated in generator 33 can be directed into the aqueous dispersion in T 34 via probe 35. More than one ultrasonic treatment can be given the liquid flowing in conduit 36 if desired or necessary.

Mechanical shearing can be accomplished in one or more colloid mills by closing valves 30, 16, 31 and 32 and opening valves 37 and 38 so that flow is through colloid mills 39.

If it is desired to use the carboxymethylcellulose dispersion instead of the dried product, valve 20 can be closed and valve 41 can be opened and the dispersion withdrawn from conduit 42. Compressor, if not operating, will block the conduit, passing material to flash tank 19. If only one stage of mechanical shearing through an orifice is desired, dispersion can be withdrawn from conduit 43 by opening valve 44 and closing valve 16.

Any method of subjecting an aqueous dispersion of carboxymethylcellulose to mechanical shearing stress can be utilized to reduce the viscosity of such dispersion. Care should be taken to avoid a heat build-up in the treatment that would result in thermal degradation of the carboxymethylcellulose. Similarly, in a system that is not liquid full the atmosphere in contact with the dispersion should be inert or reducing in order to avoid oxidation that would amount to chemical degradation.

Although the nature or mechanics of the modification of carboxymethylcellulose by the applied shearing stress is not presently known, it is believed that a selective degradation of the larger molecules occurs without appreciable crosslinking of smaller molecules and without an appreciable tendency for smaller molecules to combine. Mechanical degradation of carboxymethylcellulose can be carried to such extent that fluid loss control begins to suffer as viscosity is reduced but fluid loss control is still better than that obtained with untreated carboxymethylcellulose at comparable viscosity levels. The extent of treatment required to attain the most favorable ratio of fluid loss control and viscosity can be determined by simple tests.

The following examples will be helpful in attaining an understanding of the invention but should be considered as illustrative and not as unduly limiting the invention.

EXAMPLES

A dispersion of about 5 pounds per barrel (lb./bbl.) of medium viscosity grade sodium carboxymethylcellulose (CMC) in distilled water was prepared. All tests were made according to A.P.I. Code No. 29 at room temperature. Samples of the dispersion were passed through a partly closed valve at various differential pressure levels above atmospheric pressure. Then treated samples were tested for flow properties. A standard drilling clay utilized for preparing drilling fluids was then added to the samples in an amount equivalent to 25 lb./bbl. of drilling fluid and the samples were tested for fluid loss properties. The clay is identified as P-95.

The following Table I shows the results of the tests.

TABLE I

| Pressure differential, p.s.i. | 0 | 5,375 | 7,750 | 10,000 |
|---|---|---|---|---|
| Apparent viscosity, cps | 29.5 | 26.6 | 25.2 | 24 |
| Fluid loss, ml | 7.2 | 7.4 | 7.2 | 7.2 |

Note.—Fluid loss for 25 lb./bbl. of P-95 in water is about 30 ml.

Similar dispersions containing 1 weight percent and 1.5 weight percent medium viscosity grade CMC were passed through a colloid mill at a clearance of 0.002 inch. There was a viscosity reduction after each pass through the colloid mill. Water loss control began to suffer after 28 passes through the mill and about a 30 percent reduction in viscosity. It is believed that some chemical degradation occurred in the passes through the mill because air was not excluded and the dipersions gradually darkened after 28 passes through the mill.

The results of the examples show that the viscosifying effect of carboxymethylcellulose can be reduced without adversely affecting the fluid loss control property of the carboxymethylcellulose.

Although the invention has been described with respect to CMC (sodium carboxymethylcellulose) other cellulose products can also be similarly modified. Other cellulose products useful in drilling fluids include carboxyethylcellulose, hydroxyethylcellulose, and the like.

Dispersions of carboxymethylcellulose can be mechanically sheared by passage through an orifice at any practical pressure differential such as 10,000; 50,000 or 100,000 p.s.i. Repeated shearing can be effected for further reduction in viscosifying effect of the carboxymethylcellulose.

Any convenient concentration of aqueous dispersion can be utilized in the practice of this invention. Dispersions of about 1 to 5 weight percent are usually preferred in order to avoid extremely viscous dispersions.

Ultrasonic treatment can be applied by known ultrasonic generators and methods. Frequencies of about 350 to 1000 or higher such as 3000 kilocycles (kc.) at energy levels of 3 or 5 to 800 or more watts per square centimeter (sq. cm.).

What is claimed is:

1. The method of reducing the water viscosifying effect of carboxymethylcellulose without substantially affecting its fluid loss property which comprises subjecting an aqueous dispersion consisting essentially of water and sodium carboxymethylcellulose to a shearing action which is equivalent to passing the aqueous dispersion through an orifice at a pressure differential of at least about 5,000 lb./in.$^2$ at a temperature in the range of about 150 to 200° F. so as to reduce the viscosity of the aqueous dispersion a substantial amount.

2. The method of claim 1 wherein the shearing action is accomplished by passing the aqueous dispersion through an orifice at said pressure differential.

3. The method of claim 1 wherein the shearing action is accomplished by passing the dispersion repeatedly through a colloid mill.

4. The method of claim 1 wherein the shearing action is accomplished by subjecting the dispersion to ultrasonic waves.

5. The method of claim 1 wherein the shearing action is equivalent to passing the aqueous dispersion through an orifice at a pressure differential of about 10,000 pounds per square inch or higher.

6. The method of claim 4 wherein said ultrasonic waves are at a frequency in the range of about 350 to about 3,000 kilocycles and an energy level of at least about 3 watts per square centimeter.

7. Modified sodium carboxymethylcellulose having water viscosifying properties of low viscosity grade sodium carboxymethylcellulose and water loss control properties of medium viscosity grade sodium carboxymethylcellulose produced by the process of claim 1.

References Cited

UNITED STATES PATENTS 2,711,407    6/1955    Bauling et al. _____ 260—232

OTHER REFERENCES

Salt et al., The Rheology of Carboxymethyl Cellulose Dispersions in Water; Journal of Colloid Science, vol. 6, No. 2, pp. 146–154.

DONALD E. CZAJA, Primary Examiner

M. I. MARQUIS, Assistant Examiner

U.S. Cl. X.R.

260—231; 252—8.5; 106—197